Patented Sept. 18, 1928.

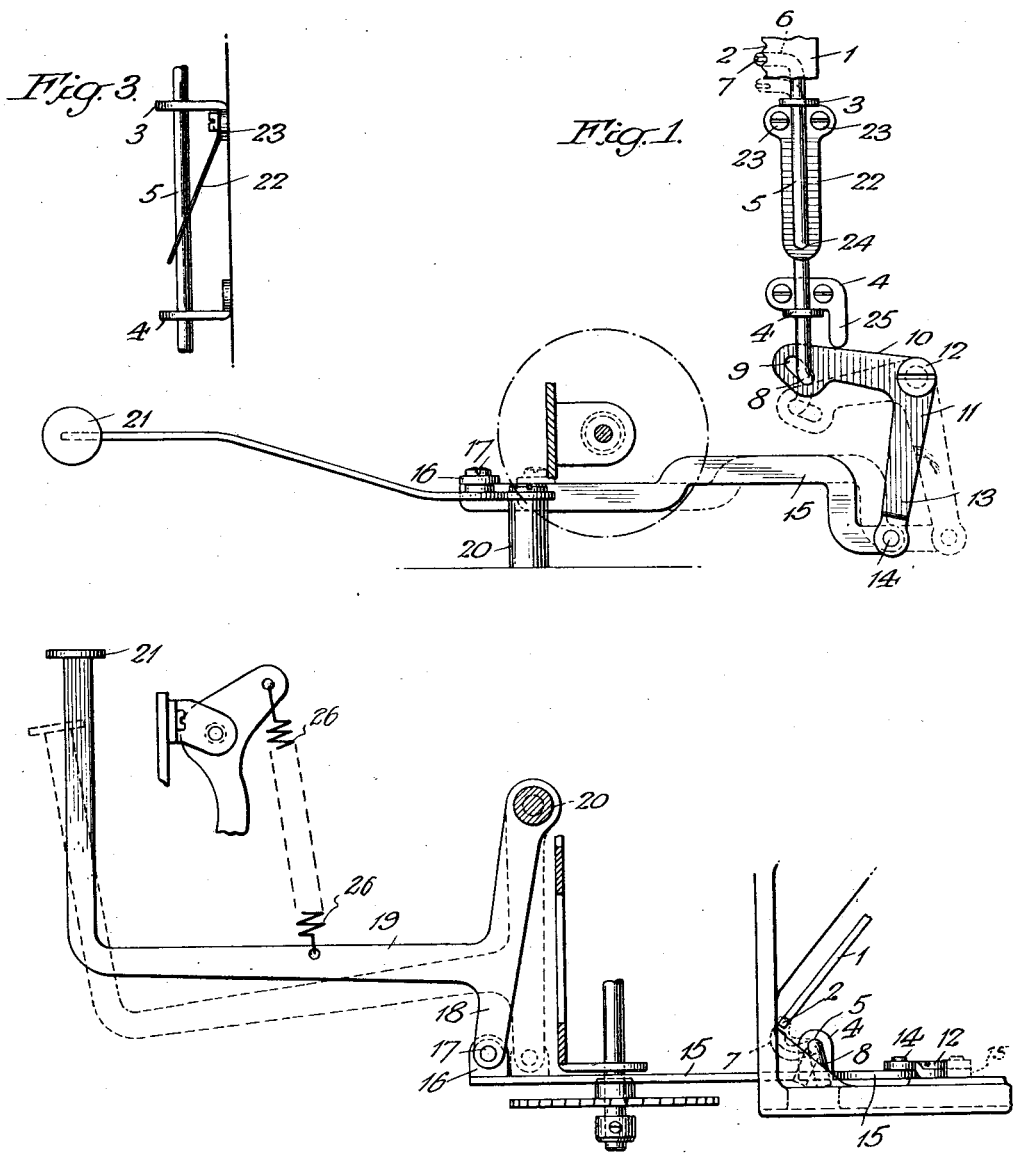

1,684,428

UNITED STATES PATENT OFFICE.

JOHN H. BARR, OF ITHACA, NEW YORK, ASSIGNOR TO BARR-MORSE CORPORATION, A CORPORATION OF NEW YORK.

BACK-SPACE MECHANISM.

Application filed August 1, 1925. Serial No. 47,403.

This invention relates to typewriting machines, and more particularly to the back spacing mechanism for the carriage thereof.

An object of the invention is to provide improved and simplified back spacing mechanism which will effectively back space the carriage in the usual manner upon the operation of a key or controlling member; with which there will be no drag upon the carriage when the device is not in use; and which will be durable, effective, simple and relatively inexpensive.

Various other objects and advantages will be apparent from the following description of one embodiment of the invention, and the novel features will be particularly pointed out hereinafter in connection with the appended claims.

In the accompanying drawing:

Fig. 1 is a sectional plan through a portion of a typewriting machine, and showing back spacer mechanism constructed in accordance with this invention, the typewriter parts not immediately concerned with the invention being omitted for the purpose of clearness;

Fig. 2 is a sectional elevation through the same; and

Fig. 3 is a side elevation of the mounting for the improved pawl member forming a part of the back spacer mechanism.

In the illustrated embodiment of the invention, the typewriter is provided with a rack 1 which is connected for operation concomitantly with the carriage (not shown), such as by a direct connection between the rack and carriage. The rack 1 is provided with a plurality of teeth 2 along the length of the same, by which it may be operated in the back spacing operation in a manner to be explained. A pair of bearing supports or elements 3 and 4 are secured to a suitable part of the frame in alignment with one another, and a pawl or member 5 having a wire or rod-like body is slidably and rotatably mounted in the supports 3 and 4. The axes of the bearings of the supports which are coincident with the axis of the member 5, are approximately parallel with the direction of travel of the rack 1.

One end 6 of the pawl 5 is bent angularly thereto and terminates in a pawl point or end 7 which is movable into or out of engagement with the teeth 2 of the rack 1 whenever the pawl 5 is rotated in the bearing supports 3 and 4. The other end of the pawl 5 is bent angularly in a somewhat similar manner; so as to form a crank arm 8 depending therefrom and entering a cam slot 9 in one arm 10 of a bell crank lever 11. The bell crank lever is pivoted at 12 to a suitable part of the frame; with the arm 10 carrying the cam slot 9 extending approximately crosswise of the direction of sliding movement of the pawl.

The cam slot 9 extends obliquely to the axis of the body of the pawl 5, as shown in Fig. 1, so that when the bell crank is rocked upon its pivot 12, it will first rock the pawl about its axis, and then shift it lengthwise in the bearing supports 3 and 4. The bell crank 11 may be disposed approximately horizontally, and its other arm 13 is pivotally connected by a pin 14 to one end of a link 15 extending forwardly of the machine. The forward end of the link has an upturned ear 16 which is pivotally connected by a pin 17 to a depending arm 18 of a key lever 19, the key lever being hinged to a side portion of the machine frame upon a horizontal axis as at 20, and extending forwardly therefrom and terminating in a key button 21.

A leaf spring 22 is secured at one end to the frame of the machine in any suitable manner, such as by screws 23 which pass therethrough and also secure one of the bearing supports (3) to the frame as shown in Figs. 1 and 3. The free end of the leaf spring 12 extends obliquely across the axis of the body of the pawl 5, and is provided with an aperture 24 through which the body of the rod 5 passes. The spring 22 is flexed to one side of the normal position in order to pass the body of the pawl 5 therethrough, so that it will normally engage frictionally with the pawl 5 and yieldably restrict or oppose both rotary and sliding movements of the pawl. The free end of the leaf spring preferably extends generally in the direction in which the pawl moves during the back spacing movement of the carriage, so that when the pawl moves during the return or idle section of its movement, the spring will tend to flex and offer less resistance to the travel of the pawl during the return stroke of the back space key.

In the operation of the back spacing mechanism which has been illustrated, whenever one desires to back space the carriage the key button 21 is depressed so as to carry the key lever 19 from the full to the dotted positions in Fig. 2. During this movement the depending arm 18 of the lever 19 will shift the link 15 rearwardly into the dotted position shown in both Figs. 1 and 2, and in so doing will rock the bell crank 11 between the full line and dotted line positions shown particularly in Fig. 1. During the beginning of this movement of the bell crank, the cam slot 9 thereof will act upon the crank arm 8 of the pawl and rock it in a rotary direction to carry the pawl point 7 into engagement with the teeth 2 of the rack 1. Thereupon when further rotation of the pawl is stopped by the engagement of the pawl point with the rack, further movement of the bell crank will shift the pawl endwise, that is, in a direction parallel with the travel of the rack 1, and carry the rack 1 over a distance sufficient to return the carriage one step of the escapement, that is, back space it one space.

The pawl point or angular end 7 is normally at such a distance from the support 3 that when the pawl 5 is moved endwise through a distance sufficient to back space the carriage one space or slightly over, the pawl point or end 7 will engage with the support 3 and limit further movement of the pawl in the same direction. Since the pawl point or end 7 is in engagement with the carriage rack at that time, this limitation of the stroke of the pawl will effectively prevent overtravel of the carriage regardless of the force applied to the back space key. Thus, a violent stroke on the back space key cannot set the carriage back more than one step or space. While the bearing support 3 is suitable for limiting the endwise movement of the pawl 5, obviously any other limit stop may be utilized instead, if desired. In Fig. 1, the dotted lines indicate the position of the back space pawl at the completion of the back space stroke, in which position the angular pawl end 7 abuts against the ear or support 3 while still in engagement with the carriage rack, and prevents overtravel of the carriage.

Thereupon when the key lever 19 is released, a suitable spring (not shown) which is connected to either the link 15 or lever 19, will return the lever to its full line position shown in Fig. 2. At the beginning of this return movement, the bell crank 11 during the beginning of its return movement will, by its cam slot 9, first rotate the pawl in the opposite direction to carry its pawl point 7 out of engagement with the rack 1, and then upon continued movement of the bell crank, the pawl 5 will be shifted endwise into the full line initial position shown in Fig. 1. The parts will then remain in this condition until the back spacing movement is again initiated.

The spring 22 frictionally holds the pawl 5 in all angular and slidable positions, so that when it is moved out of engagement from the rack, it will remain in that position until positively moved in a new back spacing operation. Since the spring 22 extends obliquely to the pawl body in a direction generally that in which the pawl body moves during the positive key stroke, that is, under the actuation of the operator, it will tend to flex slightly during the return stroke and offer less resistance to the return sliding movement of the pawl when only the return spring is operating upon the key lever.

One of the supports, 4, may have an extension 25 in a position to act as a stop for the bell crank lever 11 at the end of its return movement, so as to limit the movement of the bell crank lever under the actuation of the return spring 26 for returning the back spacing parts to normal position.

It will be observed that with this improved back spacing mechanism, the travel of the carriage and connected rack 1 is unrestricted by the back spacing mechanism, and that the movement of the pawl, during its engagement and disengagement from the rack, will be at substantially right angles to the direction of travel of the rack. Consequently a more accurate and satisfactory back spacing occurs. It will be observed that the parts are simple, durable, and easily accommodated within the space available for such mechanism.

It will be understood that various changes in the details, which have been herein described and illustrated for the purpose of explaining the nature of the invention, may be made by those skilled in the art within the principle and scope of the invention, as expressed in the appended claims.

I claim:—

1. In a typewriting machine, a rack member movable with the carriage, a pawl mounted for sliding and rotary movement, a back space key, connections between said back space key and pawl for rotating said pawl into engagement with the teeth of said member, and then moving the pawl endwise to carry the carriage with it during the one stroke of the key, and for rotating the pawl out of engagement with the teeth at the beginning of the return stroke and then moving the pawl endwise to its initial position while out of engagement with the teeth, and means frictionally engaging the pawl for yieldingly holding it in any of the positions in which it may be placed by said connections.

2. In a typewriting machine, a rack movable with the carriage and having teeth extending along the length of the same substantially parallel to the direction of travel of the carriage, a pawl member mounted for rotation, and for sliding movement in a direction parallel to the direction of travel of said rack, said member having its pawl point portion movable into and out of engagement with the teeth of the rack when said member is rotated, and key controlled means having a lost motion crank connection to said member for operating said member to back space the rack and carriage, said means during the initial portion of the back spacing movement rotating the member to carry the pawl portion into engagement with the rack, and then automatically operable upon the member to move it endwise during the remainder of this movement during the same stroke, said means being operable to rotate the member in a direction to carry its pawl portion out of engagement with the teeth during the initial part of the return movement, and then moving the member endwise to its initial position while free of the rack.

3. In a typewriting machine, a rack movable with the carriage and having teeth extending along the length of the same substantially parallel to the direction of travel of the carriage, a pawl member mounted for rotation about an axis parallel to the direction of travel of said rack, and for sliding movement in a direction parallel to said axis, said member having its pawl point portion movable into or out of engagement with the teeth of the rack when said member is rotated, and key controlled means having a crank connection to said member for operating said member to back space the rack and carriage, said means being operable during the initial portion of this back spacing movement to rotate the member and carry the pawl portion into engagement with the rack, and then move it endwise during the remainder of this movement during the same stroke, said means being also operable to rotate the member in a direction to carry its pawl portion out of engagement with the teeth during the initial part of its return movement, and then to move the member endwise to its initial position while free of the rack, said means including a member having a cam slot therein, and said member having a crank portion engaging in said slot, whereby upon movement of said member, the cam slot will rotate the crank portion to carry the pawl into or out of engagement with the rack during its initial movement in either direction and then move the member in a direction parallel to the travel of the carriage during the remainder of the same movement.

4. In a typewriting machine, a carriage operated rack having teeth extending along the length of the same substantially parallel to the direction of travel of the carriage, a pawl member mounted for rotation, and also for sliding movement in a direction parallel to the direction of travel of said rack, said member having a pawl portion movable into and out of engagement with the teeth of the rack when said member is rotated, said member also having a crank portion, and key controlled means connected to said crank portion for operating said member to back space the rack and carriage, said means being operable during the initial portion of this movement for rotating the member to carry the pawl portion into engagement with the rack, operable upon the member to move it endwise during the remainder of this back spacing movement of the rack during the same stroke, and operable to rotate the member in a direction to carry its pawl portion out of engagement with the teeth during the initial part of the return stroke movement, and then moving the member endwise to its initial position while free of the rack, said means including a lever pivoted for oscillation on an axis extending transversely of the direction of travel of the carriage, said lever having in an arm thereof a cam portion with which the crank portion of said member co-operates, the cam surfaces of said cam portion extending obliquely to the axis of rotation of said member, whereby upon movement of said lever, the cam portion will rock said member to a limited extent before said lever imparts sliding movement to said member.

5. In a typewriting machine, a rack movable with the carriage and having teeth extending along the same, supporting means having a bearing extending in a direction substantially parallel to the direction of travel of said rack, a pawl member sliding and rotating in said bearing and having a pawl arm movable into and out of engagement with the teeth of said rack when said pawl is rotated in said bearing, and key controlled means connected to said pawl for imparting an initial rotary movement thereto, and then endwise movement thereto at each stroke, whereby the pawl arm will be carried into or out of engagement with the rack teeth at the beginning of each stroke and before movement axially of said bearing begins.

6. In a typewriting machine, a rack movable with the carriage and having teeth along the same, supporting means having a bearing extending in a direction substantially parallel to the direction of travel of said rack, a pawl member, formed of an elongated rod, sliding and rotating in said bearing and having two arms extending angularly to the axis of said bearing, one angular arm of said pawl member having a pawl point movable into and out of engagement with the teeth of said rack when said pawl member is rotated in said bearing, and key controlled means connected to the other angular arm of said pawl member for imparting an initial rotary movement to said pawl member and then endwise movement thereto at each stroke, whereby the pawl point will be carried into or out of engagement with the rack teeth at the beginning of each stroke and before movement of the pawl member axially of said bearing begins, and a frictional device engaging with said pawl member for frictionally resisting both rotary and longitudinal movement thereof.

7. In a typewriting machine, a key lever pivoted upon a horizontal axis, a link connected to said key lever and extending rearwardly therefrom, a bell crank pivoted upon a vertically extending axis and having one arm thereof connected to the rear end of said link, a rack movable with the carriage and having teeth extending along the same, a pawl rotatable into and out of engagement with the teeth of said rack, said pawl and other arm of said bell crank having a cam slot connection, whereby at the beginning of each operating movement of the bell crank, the pawl will be rotated into or out of engagement with the teeth of said rack before endwise movement is imparted thereto.

8. In a typewriting machine, a rack movable with the carriage and having teeth extending along the same, a pawl having a pawl point, means for supporting said pawl for rotation about an axis approximately parallel to the direction of travel of said rack and permitting sliding movement of said pawl in a direction parallel with said rack, a leaf spring having an aperture through which the pawl passes with the spring pressing upon the pawl and frictionally resisting the rotary and sliding movements thereof, and means including a member having a cam slot and crank connection to said pawl for imparting both rotary and sliding movements to said pawl, whereby at the beginning of each movement of said member the pawl will be first rotated into or out of engagement with said rack and then given a movement parallel to the rack.

9. In a typewriting machine, a rack connected for movement concomitantly with the carriage, a pawl mounted for rotary movement into and out of engagement with the rack and for sliding movement with the rack, a leaf spring having an aperture through which the pawl extends, with the spring extending obliquely to the axis of rotation of said pawl, key controlled means connected to said pawl for rotating the pawl into engagement with the rack during the initial operation of its back spacing stroke and then shifting it endwise to back space the rack and carriage, the free end of said leaf spring extending in the direction of movement of the pawl during the back spacing movement, whereby the frictional resistance offered by the leaf spring to the sliding movement of the pawl will be a minimum during the return stroke.

10. In a typewriting machine, a carriage operated element having teeth along the same, a pawl mounted for rotary movement into and out of engagement with the teeth of said element and also for sliding movement in the direction of travel of said element, a member having a portion movable generally in the direction of movement of said element, said portion having a cam slot extending obliquely to said direction of movement, said pawl having an arm in said slot and operable by said member, whereby at each operation of said member the cam slot will first rotate the pawl to carry it into or out of engagement with the teeth of said element and then shift the pawl endwise, and means including a key for controlling the movements of said member.

11. In a typewriting machine, a carriage operated rack having teeth along the same in the direction of its movement, a rod disposed substantially parallel with the direction of travel of the rack and having its ends bent angularly thereto, means for supporting said rod for rotation and sliding movement, one angular end constituting a pawl arm, and a cam device connected to the other arm for rotating said rod to carry its pawl arm into or out of engagement with the rack teeth and then shifting it endwise during a continuance of the same movement.

12. In a back spacing mechanism, a carriage, a rack connected to the carriage for movement concomitantly therewith, a rod disposed substantially parallel with the direction of travel of said rack and having a pawl extension, means for supporting said rod for rotation and sliding movement parallel to the axis of its rotation, and means for rotating said rod to carry its pawl portion into or out of engagement with said rack and then shifting it endwise during a continuance of the same movement.

13. In a back spacing mechanism, a carriage, a rack connected to the carirage for movement concomitantly therewith, a rod disposed substantially parallel with the direction of travel of said rack and having a pawl extension, means for supporting said rod for rotation and sliding movement in the directions of travel of said rack, means for rotating said rod to carry its pawl portion into or out of engagement with said rack and then shifting it during a continuance of the same movement, and means for limiting endwise movement of said rod to prevent overthrow of said carriage.

14. In a back space mechanism, a carriage, a member connected to the carriage for movement concomitantly therewith, a rod disposed substantially parallel with the direction of travel of said member, and having a pawl extension, means for supporting said rod for rotation and sliding movement parallel to the axis of its rotation, and means including cam mechanism connected to said rod for rotating it to carry its pawl extension into engagement with said member and then shifting it during a continuance of the same movement to back space the carriage.

15. In a back space mechanism, a carriage, a rack connected to said carriage for movement concomitantly therewith, a rod disposed substantially parallel with the direction of travel of said rack and carrying a pawl extension movable into and out of engagement with said rack upon rotation of said rod about its longitudinal axis, cam means engaging with said rod for urging said rod in both rotary and longitudinal directions at the same time, and means cooperating with said rod for causing initial rotary motion until the pawl extension engages with said rack and then endwise movement of said member and rod to cause a back spacing of the carriage during a continuance of the same operation.

16. In a back spacing mechanism, a carriage to be back-spaced, a rack movable with the carriage, a pawl mounted for rotation into and out of engagement with said rack and also shiftable in a direction parallel to its axis of rotation, to impart movement to said rack, and means connected to said pawl effective at each operation in either direction to first rotate the pawl into or out of engagement with the rack and then shift said pawl to a new position.

17. In a back spacing mechanism, a carriage to be back-spaced, a rack movable with the carriage, a pawl mounted for movement into and out of engagement with said rack and also for movement in the direction of travel of the rack, and operating means connected to said pawl, the connection between the pawl and means of itself being effective at each operation of said means in either direction to move said pawl into or out of engagement with said rack and during further operation of said means to move said pawl in one of the directions of travel of said rack.

18. In a back spacing mechanism, a carriage to be back-spaced, a rack movable with the carriage, a pawl mounted for movement into and out of engagement with said rack and also for movement in the direction of travel of the rack, operating means connected to said pawl, the connection between the pawl and means of itself being effective at each operation of said means in either direction to move said pawl into or out of engagement with said rack and during further operation of said means to move said pawl in one of the directions of travel of said rack, and means for holding said pawl yieldingly in and out of engagement with said rack during travel of the pawl in the direction of travel of said rack.

In witness whereof, I hereunto subscribe my signature.

JOHN H. BARR.